United States Patent
Davies et al.

(10) Patent No.: US 9,921,394 B2
(45) Date of Patent: *Mar. 20, 2018

(54) UNIBODY DUAL-LENS MOUNT FOR A SPHERICAL CAMERA

(71) Applicant: GoPro, Inc., San Mateo, CA (US)

(72) Inventors: Joshua P. Davies, Fremont, CA (US); William H. Tolbert, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/057,896

(22) Filed: Mar. 1, 2016

(65) Prior Publication Data

US 2016/0274338 A1 Sep. 22, 2016

Related U.S. Application Data

(60) Provisional application No. 62/134,567, filed on Mar. 18, 2015, provisional application No. 62/267,864, filed on Dec. 15, 2015.

(51) Int. Cl.
*G02B 13/06* (2006.01)
*H04N 5/225* (2006.01)
(Continued)

(52) U.S. Cl.
CPC .............. *G02B 13/06* (2013.01); *G02B 7/02* (2013.01); *G02B 7/021* (2013.01); *G03B 17/12* (2013.01);
(Continued)

(58) Field of Classification Search
CPC .......... G02B 13/06; G02B 7/02; G02B 7/021; G03B 17/12; G03B 37/04; H04N 5/2254; H04N 5/2258; H04N 5/23238; H04N 7/00

See application file for complete search history.

(56) References Cited

U.S. PATENT DOCUMENTS 7,619,683 B2   11/2009   Davis
7,961,234 B2 *  6/2011   Viinikanoja ....... H04N 13/0239
                                                     348/218.1
(Continued)

OTHER PUBLICATIONS

International Search Report and Written Opinion for PCT/US2016/021269, dated May 17, 2016, 14 Pages.

*Primary Examiner* — Francis G Geroleo
(74) *Attorney, Agent, or Firm* — Fenwick & West LLP

(57) ABSTRACT

A spherical camera includes two oppositely-oriented lenses rigidly secured by a unibody dual-lens mount. The unibody dual-lens mount includes two lens barrel that are laterally offset from each other. Each lens barrel secures a lens and has a top, a midsection and a bottom along its axial length, where the midsection is located between the top and the bottom. A first base portion extends radially outward from the bottom of a first lens barrel to join the midsection of a second lens barrel. A second base portion extends radially outward from a bottom of the second lens barrel to join a midsection of the first lens barrel. The base portions may be approximately perpendicular to central axes of the lens barrels. Additionally, the first lens barrel can be approximately parallel to the second lens barrel, and the first base portion can be approximately parallel to the second base portion.

27 Claims, 6 Drawing Sheets

(51) Int. Cl.
*H04N 5/232* (2006.01)
*G02B 7/02* (2006.01)
*G03B 37/04* (2006.01)
*G03B 17/12* (2006.01)

(52) U.S. Cl.
CPC .......... *G03B 37/04* (2013.01); *H04N 5/2254* (2013.01); *H04N 5/2258* (2013.01); *H04N 5/23238* (2013.01)

(56) References Cited

U.S. PATENT DOCUMENTS

| | | | |
|---|---|---|---|
| 8,149,327 B2 | 4/2012 | Lin et al. | |
| 8,730,299 B1 * | 5/2014 | Kozko | H04N 5/2254 348/38 |
| 9,007,431 B1 * | 4/2015 | Kozko | H04N 5/2254 348/38 |
| 9,521,321 B1 * | 12/2016 | Kozko | H04N 5/23238 |
| 2008/0064437 A1 * | 3/2008 | Chambers | H04N 1/00307 455/556.1 |
| 2010/0165155 A1 | 7/2010 | Chang | |
| 2012/0206565 A1 * | 8/2012 | Villmer | H04N 1/00 348/36 |
| 2014/0192144 A1 | 7/2014 | St. Clair | |
| 2014/0218587 A1 * | 8/2014 | Shah | G03B 5/00 348/340 |
| 2014/0267596 A1 | 9/2014 | Geerds | |

* cited by examiner

UNIBODY DUAL-LENS MOUNT FOR A SPHERICAL CAMERA

CROSS-REFERENCE TO RELATED APPLICATIONS

This application claims the benefit of U.S. Provisional Application No. 62/134,567, filed on Mar. 18, 2015, and U.S. Provisional Application No. 62/267,864, filed on Dec. 15, 2015, which are incorporated by reference in their entirety.

BACKGROUND

Technical Field

This disclosure relates to a camera, and more specifically, to a lens mount in a spherical camera.

Description of the Related Art

In a spherical content capture system, a spherical camera captures images or video in a 360 degree field of view along a horizontal axis and 180 degree field of view along the vertical axis, thus capturing the entire environment around the camera system in every direction. Generally, such cameras utilize multiple camera lenses oriented in different directions and stich the images captured by the multiple camera lenses in post-processing using a stitching algorithm. When applying the stitching algorithm, it is preferable for the fields of view of the multiple camera lenses to overlap so that no portions of the resultant spherical image are missing. For best performance and most efficient application of the stitching algorithm, it is furthermore preferable that the amount of overlap is predictable and consistent between content captured from different spherical cameras.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Additionally, where terms like "substantially" or "approximately" are used herein, they refer to being within a predefined tolerance understood by those of skill in the art to meet the requirements for the intended purpose. In different cases, this could be, for example, within a 5% tolerance, a 10% tolerance, etc. Thus, in on embodiment, terms such as approximately (or substantially) parallel or approximately (or substantially) perpendicular mean that the elements are within a predefined tolerance of true parallel or true perpendicular respectively.

Example Spherical Capture Camera System

A spherical camera will capture in every direction (or substantially every direction with the exception of some relatively small blind spots) in the surrounding environment (e.g., 360 degrees in the horizontal plane and 180 degrees in the vertical plane). In order to capture spherical content, a spherical camera has at least two lenses that capture overlapping images that can be combined to form a spherical image using a stitching algorithm. In order to minimize the size and cost of the spherical camera, it is preferable to use the minimum number of lenses required to capture suitable spherical content.

Figure 1:
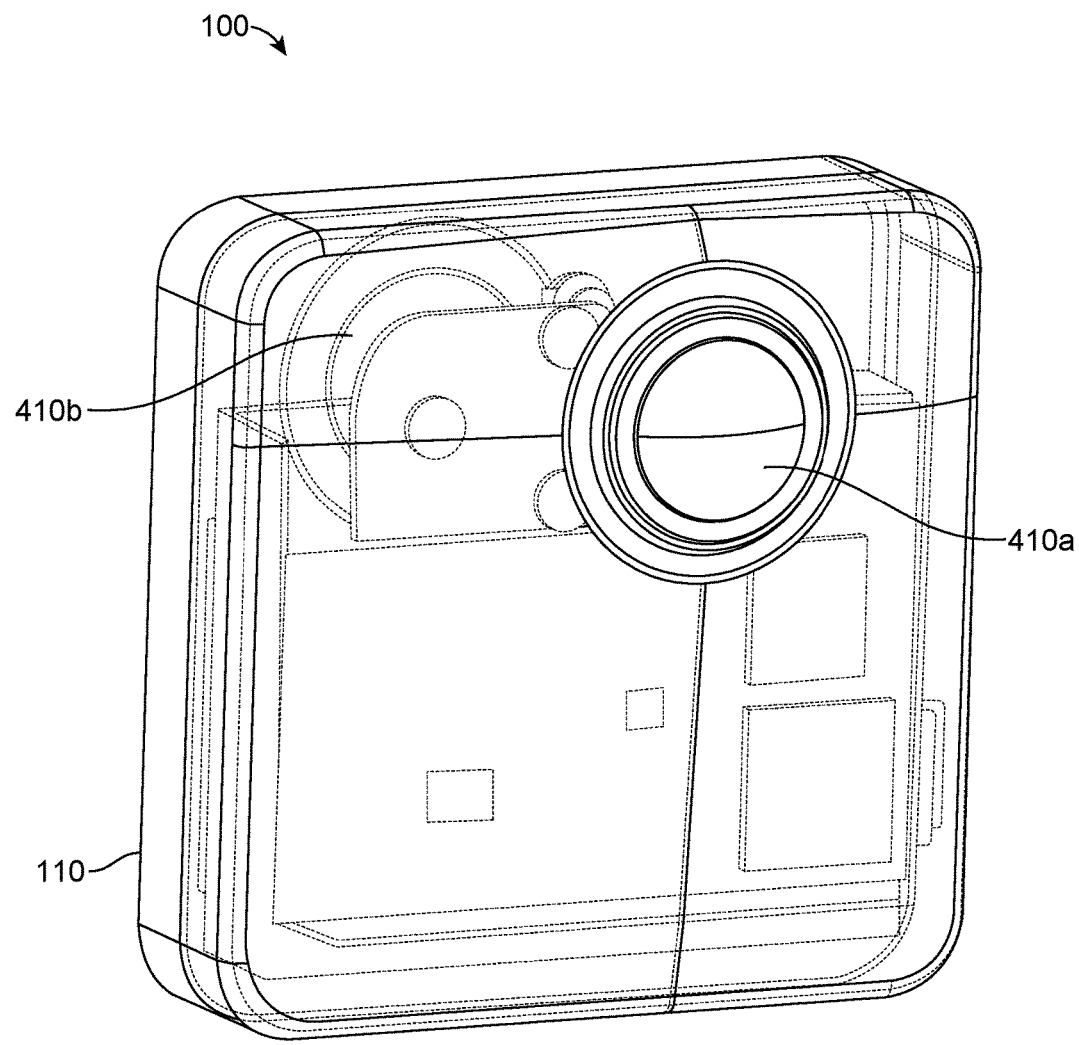
FIG. 1 illustrates a camera system capable of capturing spherical content, according to one embodiment.

FIG. 1 illustrates a spherical camera 100, according to one embodiment. The spherical camera 100 comprises a camera body 110 having two camera lenses 410 structured on a front and back surfaces of the camera body 110, various indicators on the front and/or back surface of the camera body (such as LEDs, displays, and the like), various input mechanisms (such as buttons, switches, and touch-screen mechanisms), and electronics (e.g., imaging electronics, power electronics, etc.) internal to the camera body 110 for capturing images via the camera lenses 410 and/or performing other functions. The two lenses 410 are oriented in opposite directions and couple with two images sensors mounted on circuit boards 430. Other electrical camera components (e.g., an image processor, camera SoC (system-on-chip), etc.) may also be included on a circuit board 120 within the camera body 110.

Figure 2:
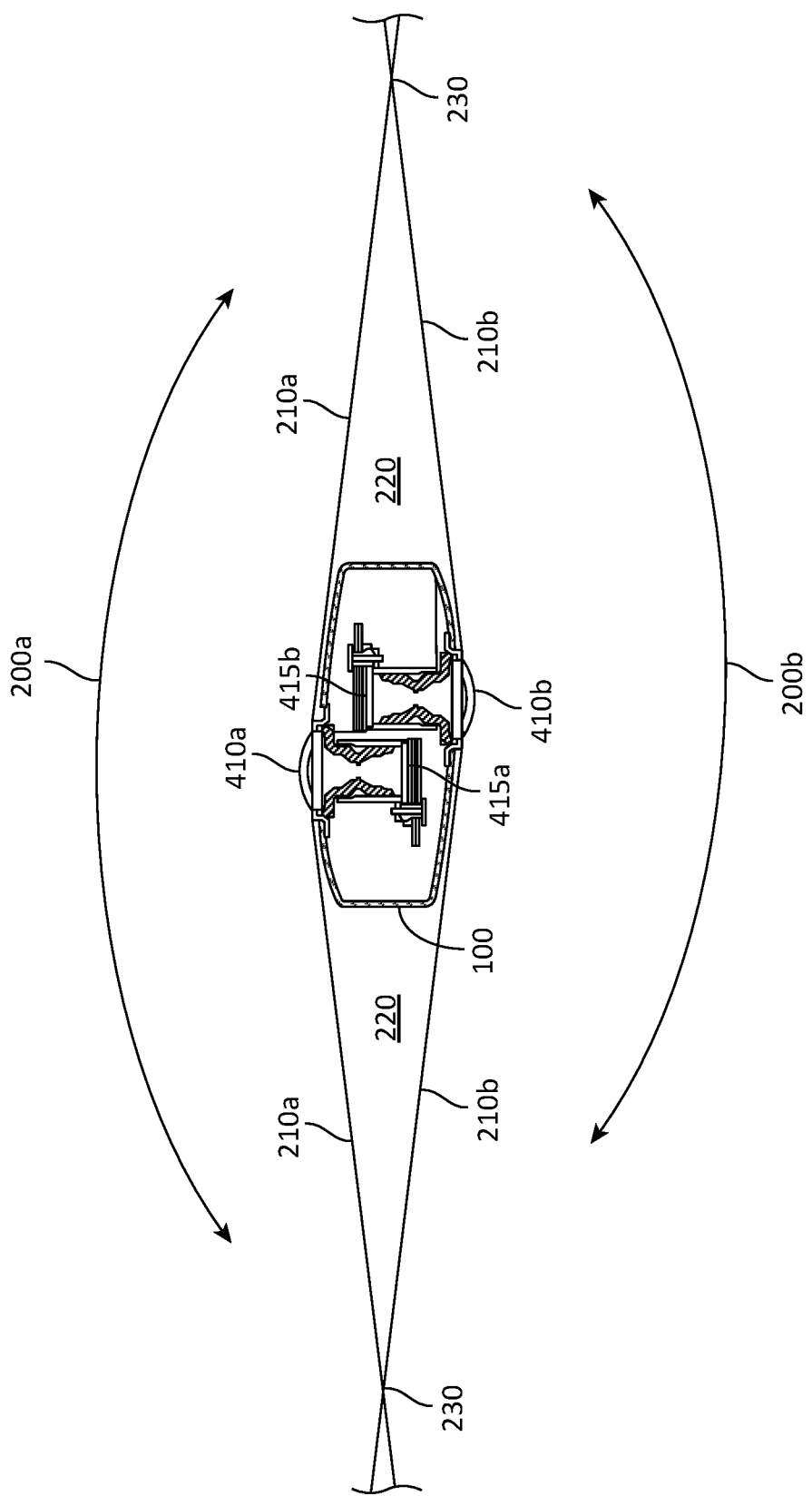
FIG. 2 illustrates a field of view of a camera system capable of capturing spherical content, according to one embodiment.

FIG. 2 illustrates a cross-sectional view and a field of view 200 of a spherical camera system 100, according to one embodiment. A first lens 410a of the spherical capture camera system 100 has field of view 200a with boundary 210a, in front of which the first image sensor 415a captures a first hyper-hemispherical image plane from light entering the first lens 410a. A second lens 410b of the spherical capture system has field of view 200b with boundary 210b, in front of which the second image sensor 415b captures a second hyper-hemispherical image plane from light entering the second lens 410b. Areas that are out of the field of view 200 of both lenses 410 are considered blind spots 220 because no content is being captured from those areas. It is desirable to minimize such blind spots 220 in order to capture as much content from the environment surrounding the spherical capture camera system 100 as possible. Out-side of overlap points 230, content captured by each lens 410 overlaps. The overlapping region can be correlated in post-processing in order to align the captured fields of view 200 and stitch them together to form a cohesive image.

As can be understood from FIG. 2, any small change in alignment (e.g., position, tilt, etc.) between the lens 410 or their respective image sensors 415 changes the relative positions of their respective fields of view 200, and the locations of the stitch points 230. This may undesirably increase the size of the blind spot 220 on one side of the camera 100. Furthermore, the stitching algorithm becomes significantly more complex if the locations of the stitch line 230 cannot be accurately known or well-estimated from the camera structure. Therefore, the camera 100 will ideally maintain the location and orientation of the lenses 410 and their respective image sensors 415 within very tight tolerances to ensure that the desired fields of view are captured and that the stitching algorithm can accurately and efficiently stitch the images together. For example, in one embodiment, optical axes through the lenses 410 are maintained substantially antiparallel to each other (e.g., within a predefined tolerance such as 1%, 3%, 5%, 10%, etc.), and the image sensors 415 are maintained substantially perpendicular (e.g., within a predefined tolerance such as 1%, 3%, 5%, 10%, etc.) to the optical axes through their respective lenses 410.

As seen in FIG. 2, in one embodiment, the lenses 410 are laterally offset from each other and each off-center from a central axis of the camera. As compared to a camera with back-to-back lenses (e.g., lenses aligned along the same axis), the laterally offset lenses enables the camera 100 to be built with substantially reduced thickness while still accommodating the lengths of the lens barrels securing the lenses 410. For example, in one embodiment, the overall thickness of the camera 100 can be close to the length of a single lens barrel as opposed to twice the lens barrel as would be needed in a back-to-back configuration. Furthermore, in one embodiment, to achieve best overlap in the fields of view 200 of the lenses 410, the lenses 410 are positioned as close together laterally as will be allowable by the lens structure.

Example Unibody Dual-Lens Mount

Figure 3A:
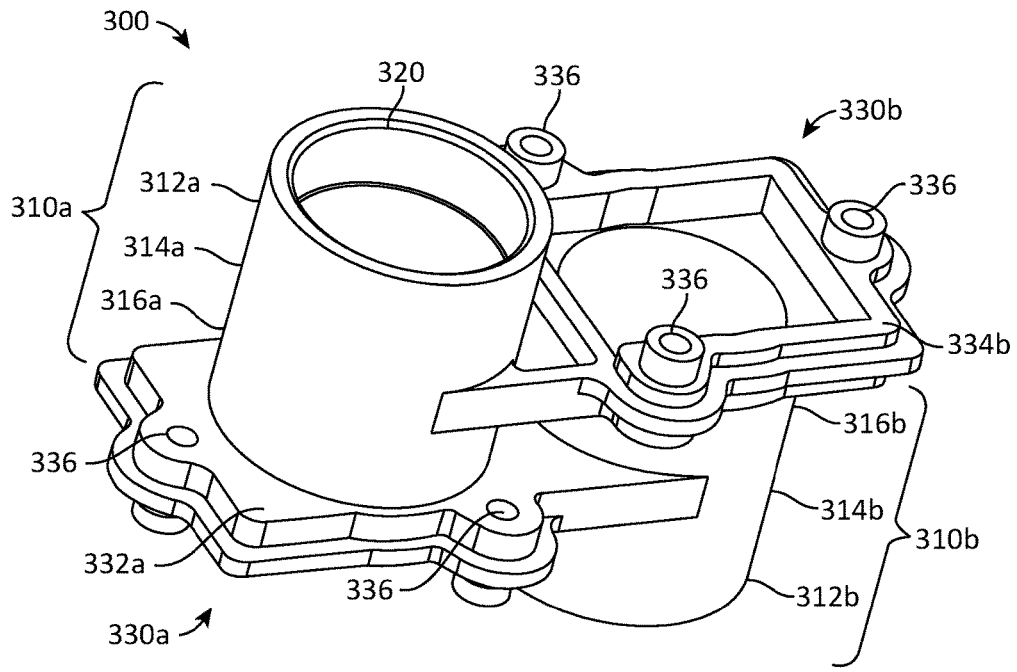
FIG. 3a illustrates a perspective view of a unibody dual-lens mount, according to one embodiment.
Figure 3B:
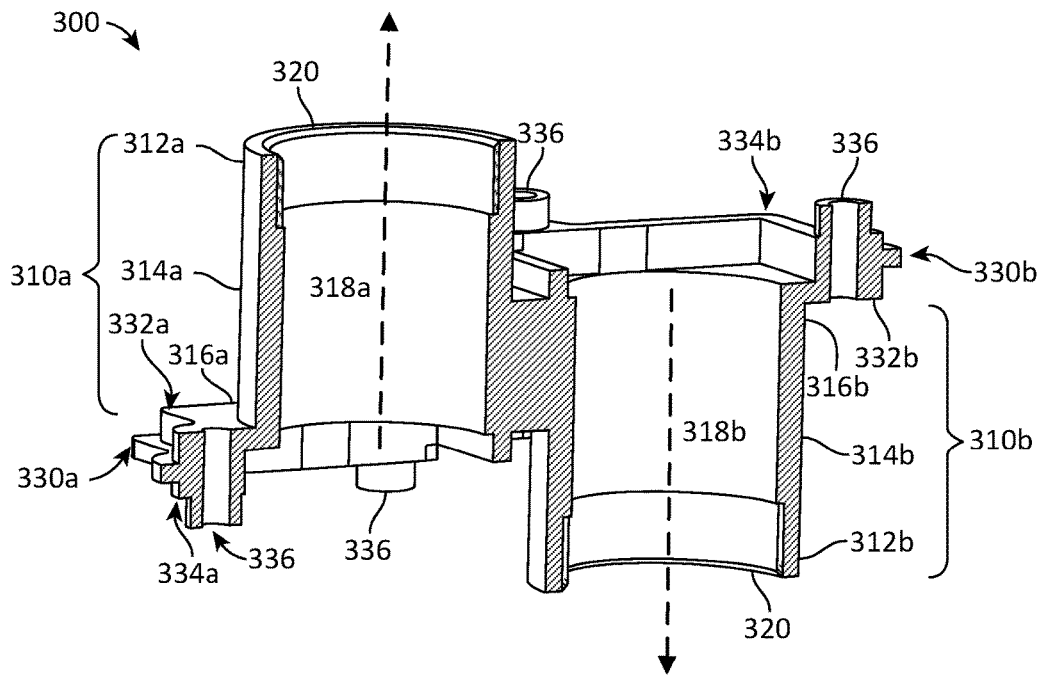
FIG. 3b illustrates a cross-sectional view of a unibody dual-lens mount, according to one embodiment.

FIGS. 3A and 3B illustrate perspective and cross-sectional views respectively of a unibody dual-lens mount 300 that is enclosed within the camera system 100, according to one embodiment. The unibody dual-lens mount 300 rigidly secures the two lenses 410 to maintain a tight tolerance between their relative positions. Though the unibody dual-lens mount 300 is discussed herein in the context of several components for the purpose of explanation, in practice it may be formed from a single uniform material (e.g., a rigid plastic). In particular, for the purpose of explanation, the unibody dual-lens mount is described in terms of two lens barrels 310 that each secure a lens 410 and two base portions 330 that join the lens barrels 310 together, all of which form portions of a single unibody construction without requiring adhesives or other fastening structures.

In one embodiment, a first lens barrel 310a has a hollow cylindrical shape and is configured to secure the first lens 410a. The first lens barrel 310a has a top 312a, midsection 314a and bottom 316a along its axial length. The midsection 314a is located between the top 312a and the bottom 316a of the first lens barrel 310a. The midsection 314a may be located at a midpoint halfway between the top 312a and the bottom 316a of the first lens barrel 310a. Alternatively, the midsection 314a can be located closer to the top 312a than the bottom 316a of the first lens barrel 310a, or closer to the bottom 316a than the top 312a of the first lens barrel 310a.

Additionally, the first lens barrel 310a has a central axis 318a that is parallel to its axial length. The first lens barrel 310a also has a diameter, which may be constant throughout the length of the cylinder. In some embodiments, the diameter has a step-wise increase near the top 312a of the first lens barrel 310a. The step-wise increase in diameter may accommodate a reciprocal piece 320 inside the first lens barrel 310a to help secure the first lens 410a.

Similarly, a second lens barrel 310b also has a hollow cylindrical shape and is configured to secure the second lens 410b. The second lens barrel 310b has a top 312b, midsection 314b and bottom 316b along its axial length. The midsection 314b is located between the top 312b and the bottom 316b of the second lens barrel 310b. The midsection 314b may be located at a midpoint halfway between the top 312b and the bottom 316b of the second lens barrel 310b. Alternatively, the midsection 314b can be located closer to the top 312b than the bottom 316b of the second lens barrel 310b, or closer to the bottom 316a than the top 312b of the second lens barrel 310b. Additionally, the second lens barrel 310b has a central axis 318b that is parallel to its axial length. The second lens barrel 310b also has a diameter, which may be constant throughout the length of the cylinder. In some embodiments, the diameter has a step-wise increase similar to that described with respect to the first lens barrel 310a. The step-wise increase in diameter may accommodate the reciprocal piece 320 inside the second lens barrel 310b to help secure the second lens 410b.

The central axis 318a of the first lens barrel 310a can be approximately antiparallel to the central axis 318b of the second lens barrel 310b, such that the lens barrels 310 are approximately aligned in parallel but oriented in opposite directions. The lens barrels 310 can also be offset laterally, perpendicular to the central axes 318. The lateral offset may be such that the lens barrels 310 are structured next to each other with only a small separation between them. In some embodiments, the lateral distance between an outer cylindrical surface of the first lens barrel 310a and an outer cylindrical surface of the second lens barrel 310b is significantly smaller than the diameter of the first lens barrel 310a or the second lens barrel 310b. Additionally, the first lens barrel 310a and the second lens barrel 310b can have approximately the same diameter and axial length.

The lens barrels 310 are joined by a first base portion 330a and a second base portion 330b. The first base portion 330a has a top surface 332a and a bottom surface 334a. The first base portion 330a extends radially outward from the bottom 316a of the first lens barrel 310a and joins with the midsection 314b of the second lens barrel 310b. Similarly, the second base portion 330b has a top surface 332b and a bottom surface 334b. The second base portion 330b extends radially outward from the bottom 316b of the second lens barrel 310b and joins with the midsection 314a of the first lens barrel 310a. The first base portion 330a can extend approximately perpendicularly relative to the central axis 318a of the first lens barrel 310a and join the second lens barrel 310b approximately perpendicular to its central axis 318b. The second base portion 330b can also extend approximately perpendicularly relative to the central axis 318b of the second lens barrel and join the first lens barrel 310a approximately perpendicular to its central axis 318a.

The first base portion 330a and the second base portion 330b can be substantially rectangular and have substantially the same thickness. This thickness can be significantly smaller than the axial lengths of the lens barrels 310. The thickness of the base portions 330 may vary to create several ridges that act to increase the rigidity of the mount 300 and reduce the relative tilts of the lens barrels 310 under stress. Furthermore, in one embodiment, the structures of the base portions 330 each include an approximately rectangular cavity for housing a circuit board on which the image sensor 415 is mounted. This structure, maintains the image sensors 415 in an orientation substantially perpendicular to the central axes 318 of the lens barrels 310. Additionally, the base portions 330 can be approximately parallel to and vertically offset from each other in the orientation shown. The lens barrels 310 and base portions 330 are structured such that the top 312a of the first lens barrel 310a extends past the bottom surface 334b of the second base potion 330b, and the top 312b of the second lens barrel 310b extends past the bottom surface 334a of the first base portion 330a. In some embodiments, the base portions 330 also include structures 336 designed to receive a connector or securing mechanism that attaches another component to the unibody dual-lens mount 300.

Example Dual-Lens Assembly

Figure 4A:
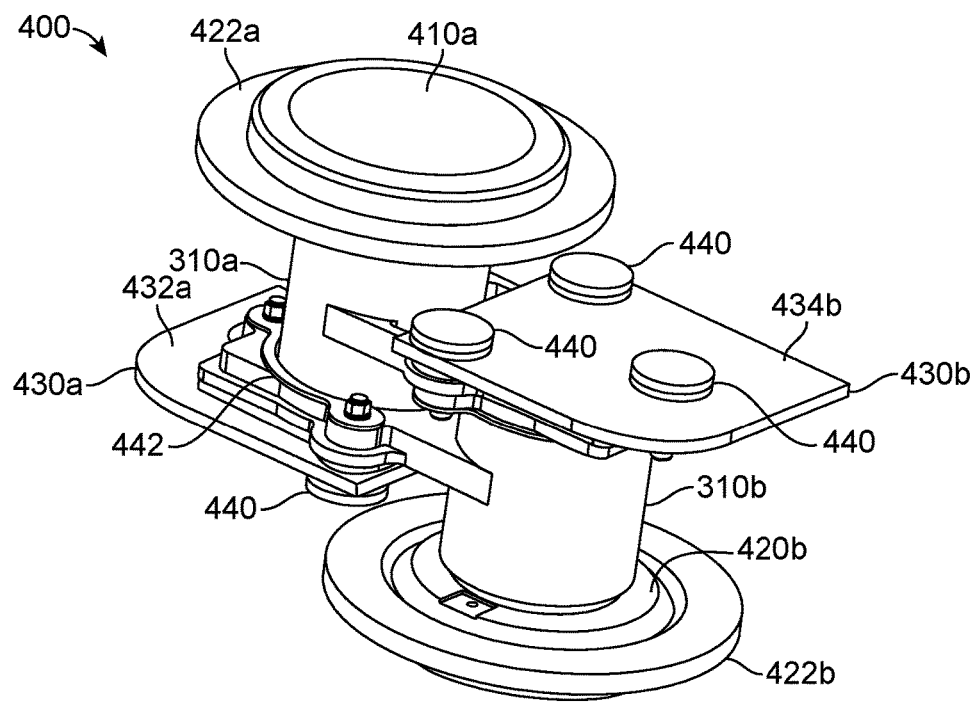
FIG. 4a illustrates a perspective view of a dual-lens assembly, according to one embodiment.
Figure 4B:
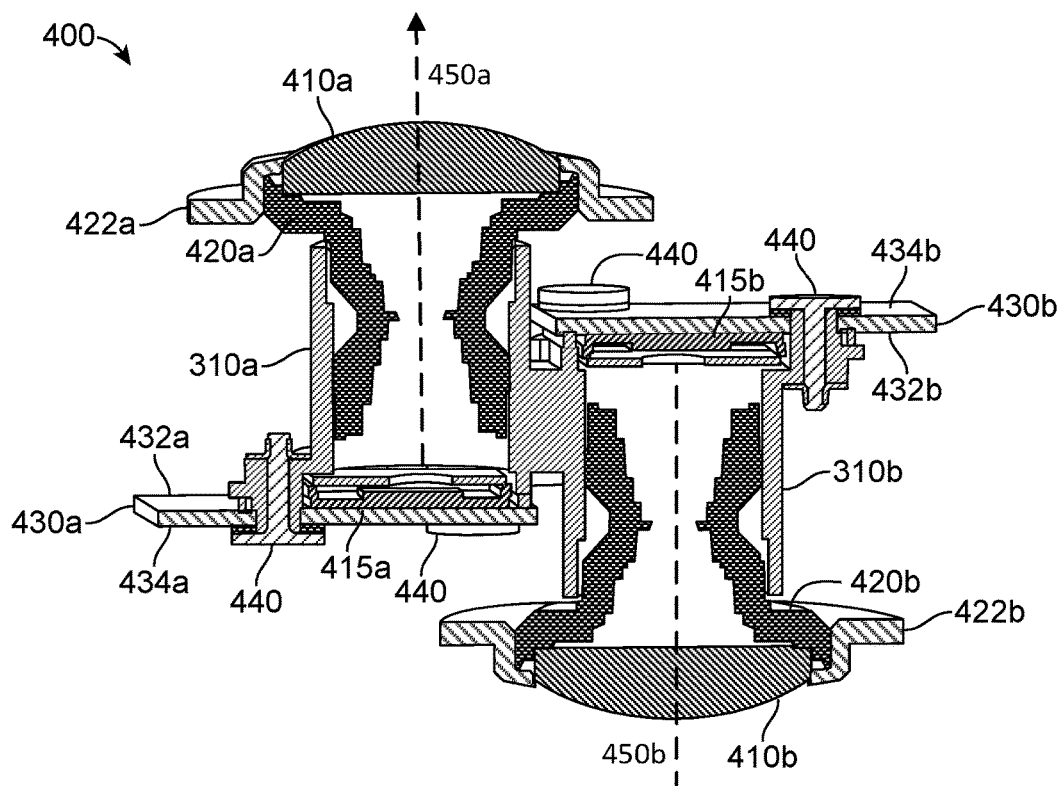
FIG. 4b illustrates a cross-sectional view of a dual-lens assembly, according to one embodiment.

FIGS. 4A and 4B illustrate perspective and cross-sectional views of a dual-lens assembly 400 including the unibody dual-lens mount 300, according to one embodiment. In addition to the unibody dual-lens mount 300, the dual-lens assembly 400 includes two lens mounts 420, two image sensors attached to circuit boards 430 and securing structures 440. Additionally, the dual-lens assembly may secure multiple internal lenses other than outward-facing lenses 410 within the lens barrels 310.

The first lens 410a is secured to the first lens barrel 310a with a first lens mount 420a. The first lens mount 420a can include a first lens frame 422a that encases the first lens 410a. Similarly, the second lens 410b is secured to the second lens barrel 310b with a second lens mount 420b, which can also include a second lens frame 422b that encases the second lens 410b. The lenses 410 may be secured such that they are approximately parallel to each other and oriented in opposite directions.

A first circuit board 430a houses a first image sensor 415a and has a top surface 432a and a bottom surface 434a. A second circuit board 430b houses a second image sensor 415b and has a top surface 434a and a bottom surface 434b. The first circuit board 430a and second circuit board 430b are secured to the unibody dual-lens mount 300 with securing structures 440. The securing structures 440 couple with the reciprocal structures 336 on the unibody dual-lens mount 300. The circuit boards 430 can be secured to the unibody dual-lens mount 300 such that the circuit boards 430 are approximately parallel to each other and oriented in opposite directions (i.e., with the image sensors 415 capturing light from opposite directions).

In some embodiments, the securing structures 440 comprise bolts, screws, or other fasteners that couple with an end piece 442 on the top surface 332 of the base portion 330. In particular, a securing structure 440 used to secure a circuit board 430 to a base portion 330 may be made up of three fasteners. Accordingly, the securing structures 404 of the dual-lens assembly may include six fasteners—three per circuit board 430 and base portion 330. Multiple fasteners of the securing structure 440 may couple with a single end piece 442. When secured by securing structures 440, the top surface 432 of the circuit board 430 may come into contact with the bottom surface 334 of the base portion 330. Alternatively, the top surface 432 of the circuit board 430 may be separated from the bottom surface 334 of the base portion 330 by another portion of the securing structures 440.

In one embodiment, the top 312a of the first lens barrel 310a extends past the bottom surface 434b of the second circuit board 430b and the top 312b of the second lens barrel 310b extends past the bottom surface 434a of the first circuit board 430a. In another embodiment, an exposed surface of the first lens 410a extends past the past the bottom surface 434b of the second circuit board 430b and an exposed surface of the second lens 410b extends past the bottom surface 434a of the first circuit board 430a. Additionally, the first lens 410a may be approximately parallel to the first circuit board 430a and the second lens 410b may be approximately parallel to the second circuit board 430b.

Figure 5:
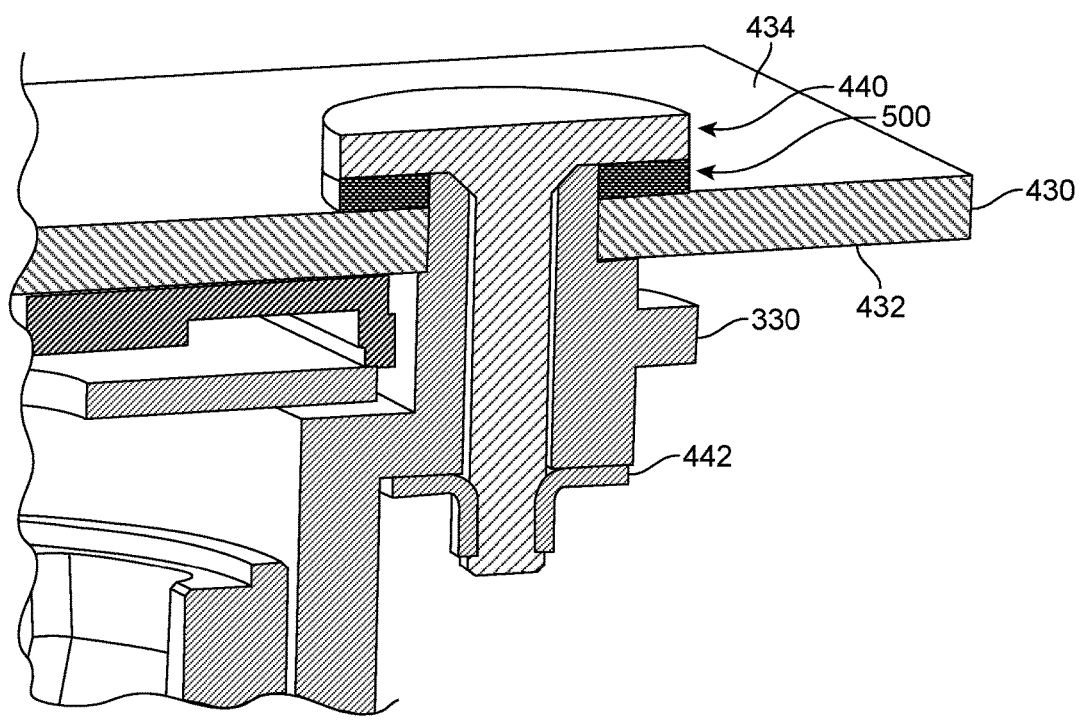
FIG. 5 illustrates a cross-sectional view of a securing structure for securing a circuit board to a unibody dual lens mount, according to one embodiment.

FIG. 5 illustrates a close-up cross-sectional view of a securing structure 440 of the lens assembly 400. In some embodiments, the fasteners of the securing structure 440 do not come into direct contact with the bottom surface 434 of the circuit board 430. Instead, there may be a piece of compressible foam 500 between the bottom surface 434 of the circuit board 430 and the bolt of the securing structure 440. In one embodiment, a securing structure 440 that includes three fasteners has compressible foam 500 between one of the fasteners and the bottom surface 434 of the circuit board 430, while the other fasteners contact the circuit board 430 directly.

The compressible foam 500 beneficially prevents or reduces twisting or tilt of the circuit board 430 (which may subsequently cause misalignment of the image sensors 415 and/or lenses 41-) resulting from tightening of the securing structure 440. Particularly, varying the compression caused by tightness of the securing structure 440 is absorbed by the compressible foam 500, thus allowing for a greater variance in the force applied by the fastener without causing optical misalignment.

Figure 6:
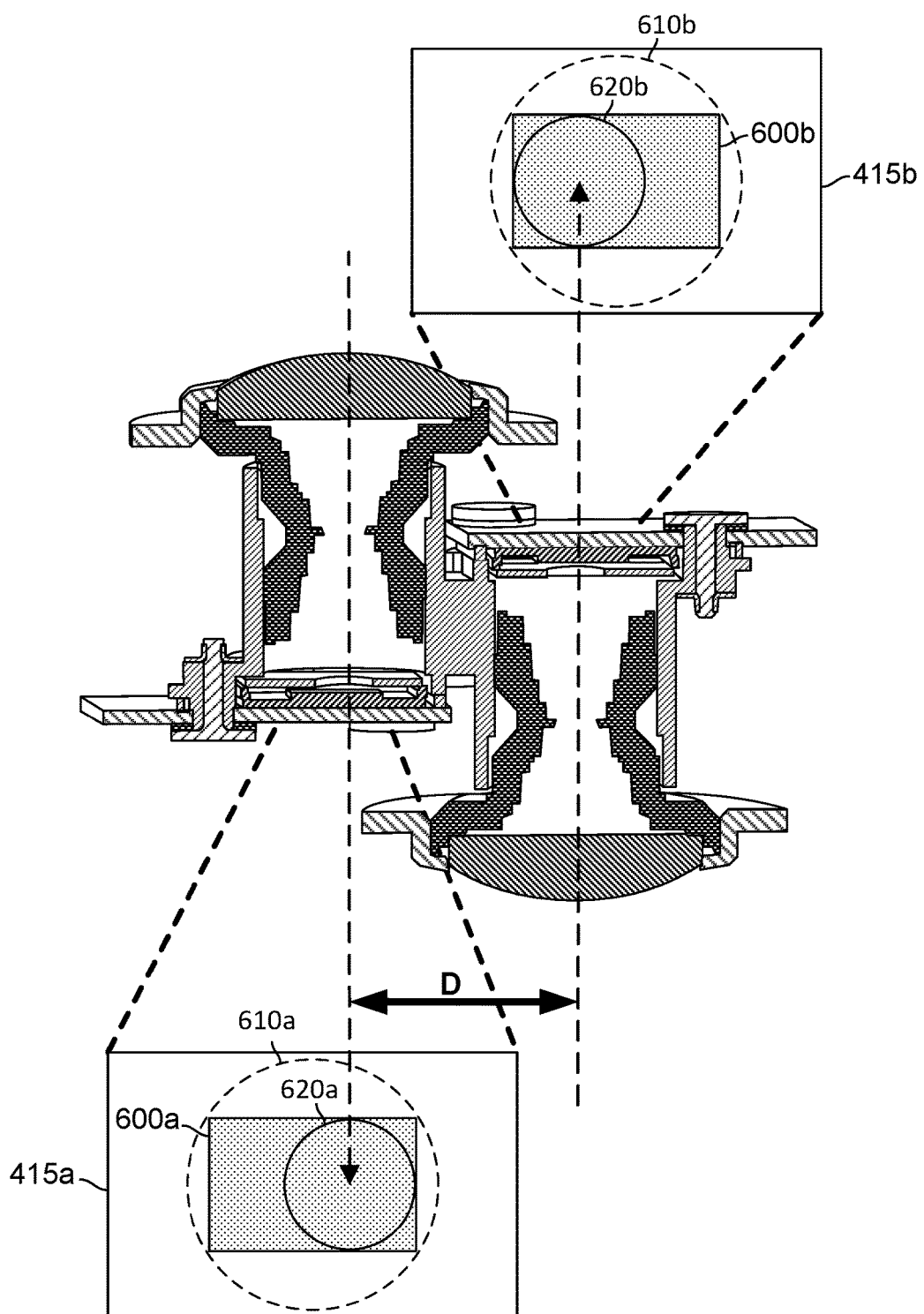
FIG. 6 illustrates a lens image circle projected onto a rectangular image sensor, according to one embodiment.

In one embodiment, the image sensors are aligned within the cavity of the base portions 330 such that the optical axis is laterally offset from the center of the image sensor. FIG. 6 illustrates image circles 620 projected onto an image sensor 415 in a spherical camera 100. The image circles 620 are projections of the cones of light transmitted by the respective lenses 410. In a conventional camera that captures rectangular images, the standard lens image circle 610 encompasses the whole photosite 600 of the image sensor 415. Because the photosite 600 is rectangular, the resulting image is rectangular. In contrast, to capture a full hemispheric image, the image circles 620 of the lenses 410 in a spherical camera 100 are instead completely located within the photosites 600. Here, the image circles 620 are aligned off-center from the center of the photosites 600 to allow the distance D between the optical axes 450 of the lenses 410 to be smaller than if the image circles 620 were centered. This beneficially reduces the area of the blind spots 220 of the spherical camera 100 and thus increases the quality of the spherical image.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A dual-lens mount comprising:
a first lens barrel having a hollow cylindrical shape, the first lens barrel having a top, a bottom and a midsection, the midsection of the first lens barrel being between the top of the first lens barrel and the bottom of the first lens barrel;
a second lens barrel having a hollow cylindrical shape, the second lens barrel having a top, a bottom and a midsection, the midsection of the second lens barrel being between the top of the second lens barrel and the bottom of the second lens barrel;
a first base portion extending in an outward radial direction from the bottom of the first lens barrel and joined with the midsection of the second lens barrel;
a second base portion extending in an outward radial direction from the bottom of the second lens barrel and joined with the midsection of the first lens barrel;
wherein the top of the first lens barrel extends past a bottom surface of the second base portion, and the top of the second lens barrel extends past a bottom surface of the first base portion.

2. The dual-lens mount of claim 1, wherein the first lens barrel, the second lens barrel, the first base portion and the second base portion comprise a unibody construction having a common material.

3. The dual-lens mount of claim 1, wherein the midsection of the first lens barrel includes a midpoint halfway between the top and the bottom of the first lens barrel, and the midsection of the second lens barrel includes a midpoint halfway between the top and the bottom of the second lens barrel.

4. The dual-lens mount of claim 1, wherein the midsection of the first lens barrel is closer to the top of the first lens barrel than the bottom of the first lens barrel, and the midsection of the second lens barrel is closer to the top of the second lens barrel than the bottom of the second lens barrel.

5. The dual-lens mount of claim 1, wherein a diameter of the first lens barrel is approximately equal to a diameter of the second lens barrel.

6. The dual-lens mount of claim 1, wherein an axial length of the first lens barrel is approximately equal to an axial length of the second lens barrel.

7. The dual-lens mount of claim 1, wherein a thickness of the first base portion is approximately equal to a thickness of the second base portion.

8. The dual-lens mount of claim 1, wherein the first base portion and the second base portion are approximately parallel to each other.

9. The dual-lens mount of claim 1, wherein a central axis of the first lens barrel and a central axis of the second lens barrel are approximately parallel to each other.

10. The dual-lens mount of claim 1, wherein the first base portion is approximately perpendicular to central axes of the first and second lens barrels, and the second base portion is approximately perpendicular to central axes of the first and second lens barrels.

11. The dual-lens mount of claim 1, wherein thicknesses of the first base portion and the second base portion are less than axial lengths of the first lens barrel and the second lens barrel.

12. The dual-lens mount of claim 1, wherein a distance between an outer cylindrical surface of the first lens barrel and an outer cylindrical surface of the second lens barrel is smaller than diameters of the first and second lens barrels.

13. The dual-lens mount of claim 1, wherein the first base portion and the second base portion are substantially rectangular.

14. A dual-lens assembly comprising:
a first lens barrel having a hollow cylindrical shape, the first lens barrel having a top, a bottom and a midsection, the midsection of the first lens barrel being between the top of the first lens barrel and the bottom of the first lens barrel;
a second lens barrel having a hollow cylindrical shape, the second lens barrel having a top, a bottom and a midsection, the midsection of the second lens barrel being between the top of the second lens barrel and the bottom of the second lens barrel;
a first base portion extending in an outward radial direction from the bottom of the first lens barrel and joined with the midsection of the second lens barrel;
a second base portion extending in an outward radial direction from the bottom of the second lens barrel and joined with the midsection of the first lens barrel;
a first lens secured to the first lens barrel; and
a second lens secured to the second lens barrel;
wherein the top of the first lens extends past the bottom surface of the second base portion, and the second lens extends past the bottom surface of the first base portion.

15. The dual-lens assembly of claim 14, wherein the top of the first lens barrel extends past the bottom surface of the second base portion, and the top of the second lens barrel extends past the bottom surface of the first base portion.

16. The dual-lens assembly of claim 14, further comprising:
a first lens mount protruding from the first lens barrel, the first lens mount securing the first lens to the first lens barrel; and
a second lens mount protruding from the second lens barrel, the second lens mount securing the second lens to the second lens barrel.

17. The dual-lens assembly of claim 16, wherein the first lens mount encases a bottom surface and an edge of the first lens, and the second lens mount encases a bottom surface and an edge of the second lens.

18. The dual-lens assembly of claim 14, further comprising:
   a first circuit board;
   a first securing structure securing a top surface of the first circuit board to the bottom surface of the first base portion;
   a second circuit board; and
   a second securing structure securing a top surface of the second circuit board to the bottom surface of the second base portion;
   wherein the first lens extends past a bottom surface of the second circuit board, and the second lens extends past a bottom surface of the first circuit board.

19. The dual-lens assembly of claim 18, wherein the top of the first lens barrel extends past the bottom surface of the second circuit board, and the top of the second lens barrel extends past the bottom surface of the first circuit board.

20. The dual-lens assembly of claim 18, wherein the first and second securing structures each comprise one or more fasteners, the dual-lens assembly further comprising:
   a compressible foam element positioned between at least one of the one or more fasteners and the first or second circuit board.

21. The dual-lens assembly of claim 20, wherein the first and second securing structures each comprise three fasteners, one of the three fasteners having a piece of compressible foam position between the fastener and the first or second circuit board.

22. The dual-lens assembly of claim 18, wherein the first and second circuit boards are approximately parallel to each other.

23. The dual-lens assembly of claim 18, wherein a first image circle of the first lens is off-center relative to a first photosite of a first image sensor mounted on the first circuit board.

24. The dual-lens assembly of claim 23, wherein a second image circle of the second lens is off-center relative to a second photosite of a second image sensor mounted on the second circuit board in a direction towards the first lens.

25. A camera comprising:
   a camera body;
   a first lens protruding from the camera body;
   a second lens protruding from the camera body;
   a unibody dual-lens mount contained within the camera body, the unibody dual-lens mount having a first lens barrel and a second lens barrel having respective longitudinal axes oriented substantially parallel to each other, the first lens secured to the first lens barrel and the second lens secured to the second lens barrel such that the first lens and second lens are oriented in opposite directions;
   a first image sensor oriented substantially perpendicular to the first lens barrel, the first image sensor to capture light passing through the first lens; and
   a second image sensor oriented substantially perpendicular to the second lens barrel, the second image sensor to capture light passing through the second lens,
   wherein:
      the first lens barrel has a hollow cylindrical shape, and wherein the first lens barrel has a top, a bottom and a midsection, the midsection of the first lens barrel being between the top of the first lens barrel and the bottom of the first lens barrel;
      the second lens barrel has a hollow cylindrical shape, and wherein the second lens barrel has a top, a bottom and a midsection, the midsection of the second lens barrel being between the top of the second lens barrel and the bottom of the second lens barrel;
      the unibody dual-lens mount further comprises:
         a first base portion extending in an outward radial direction from the bottom of the first lens barrel and joined with the midsection of the second lens barrel; and
         a second base portion extending in an outward radial direction from the bottom of the second lens barrel and joined with the midsection of the first lens barrel; and
      the first lens extends past a bottom surface of the second base portion, and the second lens extends past a bottom surface of the first base portion.

26. The camera of claim 25, wherein a first image circle of the first lens is off-center relative to a first photosite of a first image sensor mounted on the first circuit board.

27. The camera of claim 26, wherein a second image circle of the second lens is off-center relative to a second photosite of a second image sensor mounted on the second circuit board in a direction towards the first lens.

* * * * *